United States Patent
Wu

(10) Patent No.: US 11,425,326 B2
(45) Date of Patent: Aug. 23, 2022

(54) IMAGE PROCESSING DEVICE AND IMAGE PROCESSING METHOD

(71) Applicant: Coretronic Corporation, Hsin-Chu (TW)

(72) Inventor: Jian-Jiun Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/137,361

(22) Filed: Dec. 30, 2020

(65) Prior Publication Data
US 2021/0211602 A1 Jul. 8, 2021

(30) Foreign Application Priority Data
Jan. 2, 2020 (CN) .......................... 202010002337.1

(51) Int. Cl.
 *H04N 7/01* (2006.01)
 *H04N 5/45* (2011.01)
 *H04N 5/445* (2011.01)

(52) U.S. Cl.
CPC ........... *H04N 5/44504* (2013.01); *H04N 5/45* (2013.01); *H04N 7/013* (2013.01)

(58) Field of Classification Search
CPC ...... H04N 5/44504; H04N 5/45; H04N 7/013; H04N 5/46; H04N 9/3141; H04N 9/3147; H04N 9/3179
See application file for complete search history.

(56) References Cited

U.S. PATENT DOCUMENTS

| 6,353,460 | B1* | 3/2002 | Sokawa ................ H04N 5/45 348/554 |
| 9,294,097 | B1 | 3/2016 | Vassiliev |
| 2002/0001410 | A1* | 1/2002 | Hagiwara ............. G06T 9/007 382/232 |
| 2006/0055962 | A1* | 3/2006 | Saito .................. H04N 1/00204 358/1.15 |

(Continued)

FOREIGN PATENT DOCUMENTS

| CN | 102970546 | 3/2013 |
| CN | 104471949 | 3/2015 |
| JP | 2010206528 | 9/2010 |

OTHER PUBLICATIONS

"Office Action of China Counterpart Application", dated May 11, 2022, p. 1-p. 7.

*Primary Examiner* — Paulos M Natnael
(74) *Attorney, Agent, or Firm* — JCIPRNET

(57) ABSTRACT

An image processing device and an image processing method are provided. The image processing device includes multiple image input units, an expansion module, a controller, and an image processing module. The multiple image input units are configured to receive multiple image signals and convert the multiple image signals into multiple converted image signals. The multiple converted image signals have a first image format. The expansion module is detachably coupled to the multiple image input units and is configured to output selected image signals according to a first selection signal. The controller is configured to provide the first selection signal. The image processing module is configured to receive the selected image signals to integrate into a picture in picture.

11 Claims, 6 Drawing Sheets

(56) References Cited

U.S. PATENT DOCUMENTS

2008/0091065 A1* 4/2008 Oshima ............... H04N 19/60
                                              600/109
2015/0002489 A1* 1/2015 Kawahara ............ H04N 5/63
                                              345/204
2018/0190237 A1* 7/2018 Li ..................... G06F 3/1423

* cited by examiner

IMAGE PROCESSING DEVICE AND IMAGE PROCESSING METHOD

CROSS-REFERENCE TO RELATED APPLICATION

This application claims the priority benefit of China application serial no. 202010002337.1, filed on Jan. 2, 2020. The entirety of the above-mentioned patent application is hereby incorporated by reference herein and made a part of this specification.

BACKGROUND

Technical Field

The disclosure relates to an image processing device and an image processing method, and in particular, to an image processing device and an image processing method capable of expanding the number of received image signals.

Description of Related Art

Generally speaking, the current image processing technologies of projectors generally have the function of combining multiple image signals into a composite image. When receiving the multiple image signals, the projector may perform an image operation, such as a picture in picture (PiP) operation, a picture by picture (PbP) operation, or a picture on picture (PoP) operation, on the multiple image signals.

However, current projectors have a fixed number of image signal receiving interfaces, and the image signal receiving interfaces can only support fixed and non-replaceable receiving formats (such as HDMI, VGA, 3G-SDI, RGB, YCbCr, etc.). Therefore, the image operations of the current projectors will be limited by the number of the image signal receiving interfaces and the supported formats.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides an image processing device and an image processing method capable of expanding the number of received image signals.

Other objectives and advantages of the disclosure can be further understood from the technical features disclosed by the disclosure.

In order to achieve one, part, or all of the objectives or other objectives, an embodiment of the disclosure provides an image processing device. The image processing device includes multiple image input units, an expansion module, a controller, and an image processing module. The multiple image input units are configured to receive multiple image signals and to convert the multiple image signals into multiple converted image signals. The multiple converted image signals have a first image format. The expansion module is detachably coupled to the multiple image input units and is configured to output a first number of selected image signals according to a first selection signal. The controller is coupled to the expansion module and is configured to provide the first selection signal. The image processing module is coupled to the expansion module and is configured to receive the first number of the selected image signals to combine into a picture in picture (PiP).

In order to achieve one, part, or all of the objectives or other objectives, an embodiment of the disclosure provides an image processing method. The image processing method includes the following steps. Multiple image input units and an expansion module are provided, and the expansion module is detachably coupled to the multiple image input units. Multiple image signals are received by the multiple image input units and the multiple image signals are converted into multiple converted image signals. The multiple converted image signals have a first image format. A first selection signal is provided and a first number of selected image signals is outputted by the expansion module according to the first selection signal. The first number of the selected image signals is received and is combined into a PiP.

In light of the above, the embodiments of the invention at least demonstrate one or more of the advantages or effects below. The embodiments of present invention may select the suitable image input unit according to the image signal format requirements, and may detachably couple the image input unit to the expansion module according to usage requirements.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
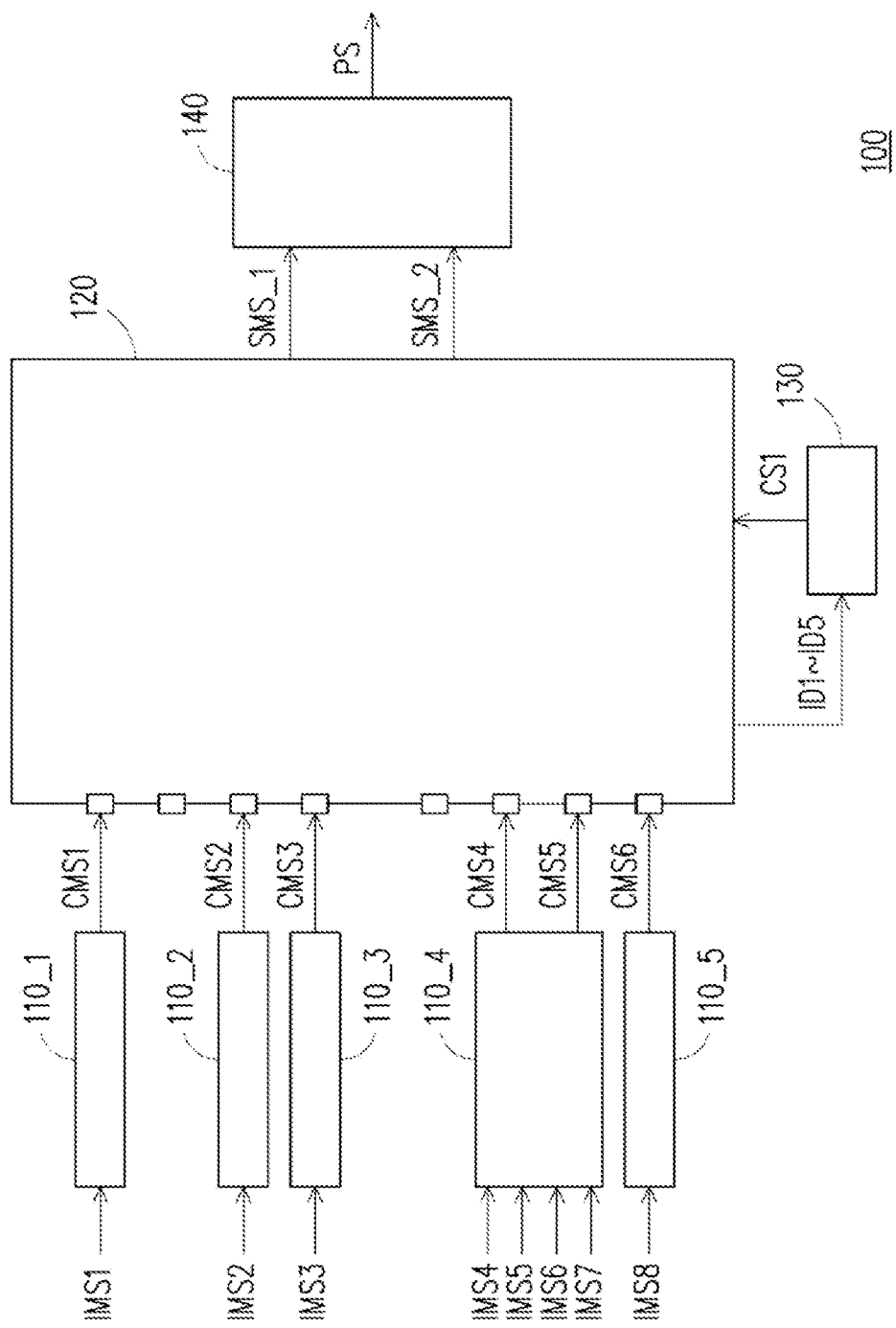
FIG. 1 is a schematic view of an image processing device according to a first embodiment of the disclosure.

Please refer to FIG. 1. FIG. 1 is a schematic view of an image processing device according to a first embodiment of the disclosure. In the embodiment, an image processing device 100 is applicable to a projection device or a display device. The image processing device 100 includes image input units 110_1 to 110_5, an expansion module 120, a controller 130, and an image processing module 140. The image input units 110_1 to 110_5 are configured to receive image signals IMS1 to IMS8 and convert the image signals IMS1 to IMS8 into converted image signals CMS1 to CMS6 having a first image format. The first image format may be, for example, a digital RGB color format or a digital YCbCr color format. For example, the image input unit 110_1 receives, for example, the image signal IMS1 having a VGA format and converts the image signal IMS1 into the converted image signal CMS1 having the first image format. The image input unit 110_2 receives, for example, the image signal IMS2 having the VGA format and converts the image signal IMS2 into the converted image signal CMS2 having the first image format. The image input unit 110_3 receives, for example, the image signal IMS3 having the VGA format and converts the image signal IMS3 into the converted image signal CMS3 having the first image format. The image input unit 110_4 is an image input unit having 4 input interfaces and 2 output interfaces. The image input unit 110_4 receives, for example, the image signals IMS4 to IMS7 having a HDMI or DVI format and converts two of the image signals IMS4 to IMS7 into the converted image signals CMS4 and CMS5 having the first image format. The image input unit 110_5 receives, for example, the image signal IMS8 having a 3G-SDI format and converts the image signal IMS8 into the converted image signal CMS6 having the first image format. For ease of description, the embodiment is exemplified using 8 image signals, 5 image input units, and 6 converted image signals. The number of image input units, the number of image signals, and the number of converted image signals of the disclosure may be adjusted according to usage requirements and design requirements, and are not limited to the embodiment.

In the embodiment, the image input units 110_1 to 110_3 and 110_5 respectively have a single first input interface (for example, an interface of the image input unit 110_1 configured to connect to the image signal IMS1) and a single first format converter. Taking the image input unit 110_1 as an example, the first input interface of the image input unit 110_1 is configured to receive the image signal IMS1 having the VGA format. The first format converter of the image input unit 110_1 is coupled to the first input interface of the image input unit 110_1. The first format converter of the image input unit 110_1 is configured to convert the image signal IMS1 into the converted image signal CMS1 having the first image format.

In the embodiment, the expansion module 120 is detachably coupled to the image input units 110_1 to 110_5 and the expansion module 120 may receive the converted image signals CMS1 to CMS6 provided by the image input units 110_1 to 110_5.

The controller 130 is coupled to the expansion module 120 and is configured to provide a first selection signal CS1 to the expansion module 120. The expansion module 120 also outputs a first number of selected image signals SMS_1 and SMS_2 according to the first selection signal CS1. In the embodiment, the expansion module 120 may receive up to 8 converted image signals and the first number is equal to 2, but the disclosure is not limited thereto.

In the embodiment, the image input units 110_1 to 110_5 respectively have identification codes ID1 to ID5. When the image input units 110_1 to 110_5 are coupled to the expansion module 120, the expansion module 120 provides the identification codes ID1 to ID5 to the controller 130. The controller 130 generates the first selection signal CS1 according to the identification codes ID1 to ID5 and provides the first selection signal CS1 to the expansion module 120. It should be understood that when only some of the image input units (for example, the image input units 110_1 to 110_3) are coupled to the expansion module 120, the expansion module 120 will provide the corresponding identification codes (for example, the identification codes ID1 to ID3) in the identification codes ID1 to ID5 to the controller 130. The controller 130 generates the first selection signal CS1 according to the corresponding identification codes (for example, the identification codes ID1 to ID3). The expansion module 120 selects the first number (the first number is, for example, equal to 2) of the converted image signals from the converted image signals (for example, the converted image signals CMS1 to CMS3) of the some of the image input units according to the first selection signal CS1 and use the selected converted image signals as the selected image signals SMS_1 and SMS_2.

In the embodiment, the controller 130 may determine the selection priority order of the converted image signals CMS1 to CMS6 according to the identification codes ID1 to ID5 and provide the first selection signal CS1 related to the selection priority order of the converted image signals CMS1 to CMS6. After the expansion module 120 receives the first selection signal CS1, the expansion module 120 outputs the selected image signals SMS_1 and SMS_2 according to the first selection signal CS1.

In some embodiments, the expansion module 120 may also perform a color space conversion to a specific first image format. For example, the first image format of the converted image signal CMS6 is YCbCr color format. The expansion module 120 may convert the YCbCr color format of the converted image signal CMS6 to the RGB color format.

In the embodiment, the image processing module 140 is coupled to the expansion module 120. The image processing module 140 is configured to receive the first number of the selected image signals SMS_1 and SMS_2, so as to perform an image operation on the selected image signals SMS_1 and SMS_2, so as to generate a picture in picture (PiP) PS. In some embodiments, the image processing module 140 may also perform an image operation on the selected image signals SMS_1 and SMS_2 to generate a picture by picture (PbP) or a picture on picture (PoP).

It is worth mentioning here that the embodiment provides the expansion module 120 and the image input units 110_1 to 110_5 applicable to different digital image formats. The image input units 110_1 to 110_5 convert the image signals IMS1 to IMS8 into the converted image signals CMS1 to CMS6. The expansion module 120 may be detachably coupled to the image input units 110_1 to 110_5 and select the selected image signals SMS_1 and SMS_2 from the converted image signals CMS1 to CMS6. In the embodiment, the corresponding multiple image input units may be selected according to the image signal format to be received and the corresponding multiple image input units may be detachably coupled to the expansion module 120 according to usage requirements. In this way, the user may select a suitable image input unit according to multiple image signal format requirements and the flexibility of the image processing device 100 in receiving image signals can be improved.

Figure 2:
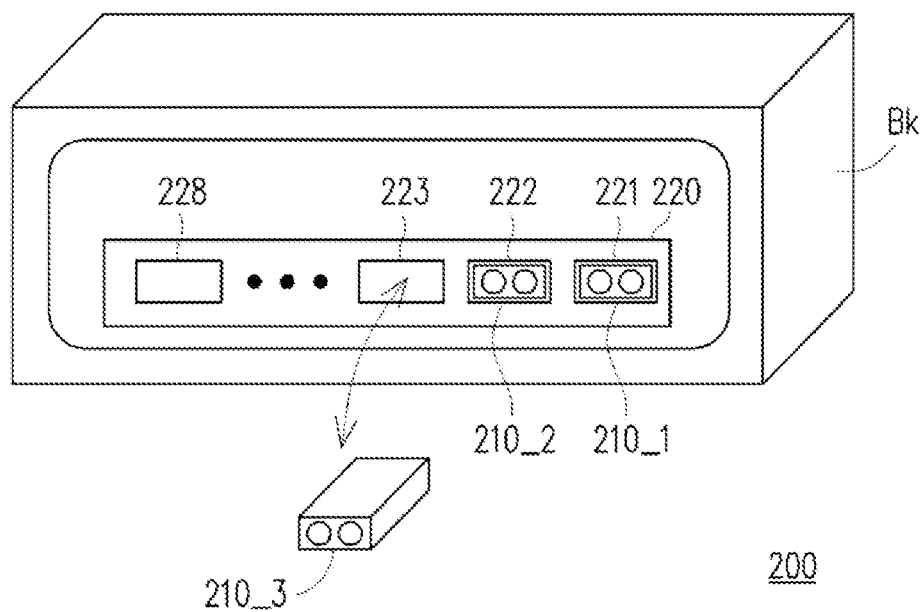
FIG. 2 is a schematic view of a detachable coupling of an image processing device according to a second embodiment of the disclosure.

The following describes the implementation of the image input unit detachably coupled to the expansion module. Please refer to FIG. 2. FIG. 2 is a schematic view of a detachable coupling of an image processing device according to a second embodiment of the disclosure. In the embodiment, an image processing device 200 includes a casing Bk, image input units 210_1 to 210_3, an expansion module 220, a controller (not shown), and an image processing module (not shown). Sufficient teachings of the implementation details of the image input units 210_1 to 210_3, the expansion module 220, the controller, and the image processing module may be obtained from the image input units 110_1 to 110_3, the expansion module 120, the controller 130, and the image processing module 140 of the first embodiment shown in FIG. 1, so there will be no reiteration here. The casing Bk is configured to accommodate the expansion module 220, the controller, and the image processing module. In the embodiment, the expansion module 220 may be designed to have slots 221 to 228. In the embodiment, the image input units 210_1 to 210_3 may respectively be selectively assembled with one of the slots 221 to 228. Therefore, the expansion module 220 may be detachably coupled to the image input units 210_1 to 210_3 via the slots 221 to 228. For example, when the image input unit 210_1 is assembled with the slot 221, the expansion module 220 is coupled to the image input unit 210_1 via the slot 221. The image input unit 210_2 is assembled with the slot 222. The expansion module 220 is coupled to the image input unit 210_2 via the slot 222. Therefore, when the image input units 210_1 and 210_2 respectively receive image signals, the expansion module 220 receives a converted image signal provided by the image input unit 210_1 via the slot 221 and receives a converted image signal provided by the image input unit 210_2 via the slot 222. In this way, the user may select a suitable image input unit to be assembled with the expansion module 220 according to the multiple image signal format requirements.

Figure 3:
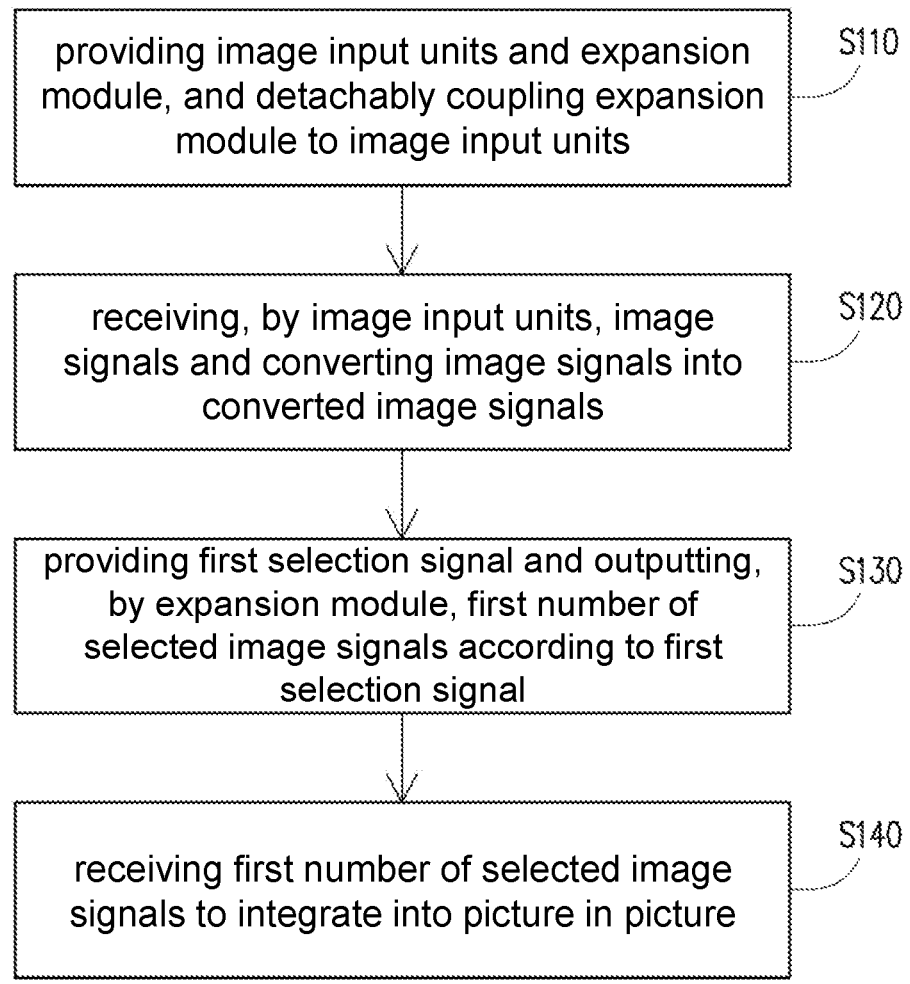
FIG. 3 is an operational flowchart of an image processing method according to an embodiment of the disclosure.

Please refer to FIG. 1 and FIG. 3 at the same time. FIG. 3 is an operational flowchart of an image processing method according to an embodiment of the disclosure. The image processing method of the embodiment is applicable to the image processing device 100 of FIG. 1. In the embodiment, in Step S110, the image input units 110_1 to 110_5 and the expansion module 120 are provided, and the image input units 110_1 to 110_5 are detachably coupled to the expansion module 120. In Step S120, the image processing device 100 receives the image signals IMS1 to IMS8 by the image input units 110_1 to 110_5 and converts the image signals IMS1 to IMS8 into the converted image signals CMS1 to CMS6. In Step S130, the image processing device 100 provides the first selection signal CS1 by the controller 130 and outputs the first number of the selected image signals SMS_1 and SMS_2 by the expansion module 120 according to the first selection signal CS1. In Step S140, the image processing device 100 receives the first number of the selected image signals SMS_1 and SMS_2 to integrate into the PiP PS. Sufficient teachings of the implementation details of Steps S110 to S140 may be obtained from the first embodiment shown in FIG. 1, so there will be no reiteration here.

Figure 4:
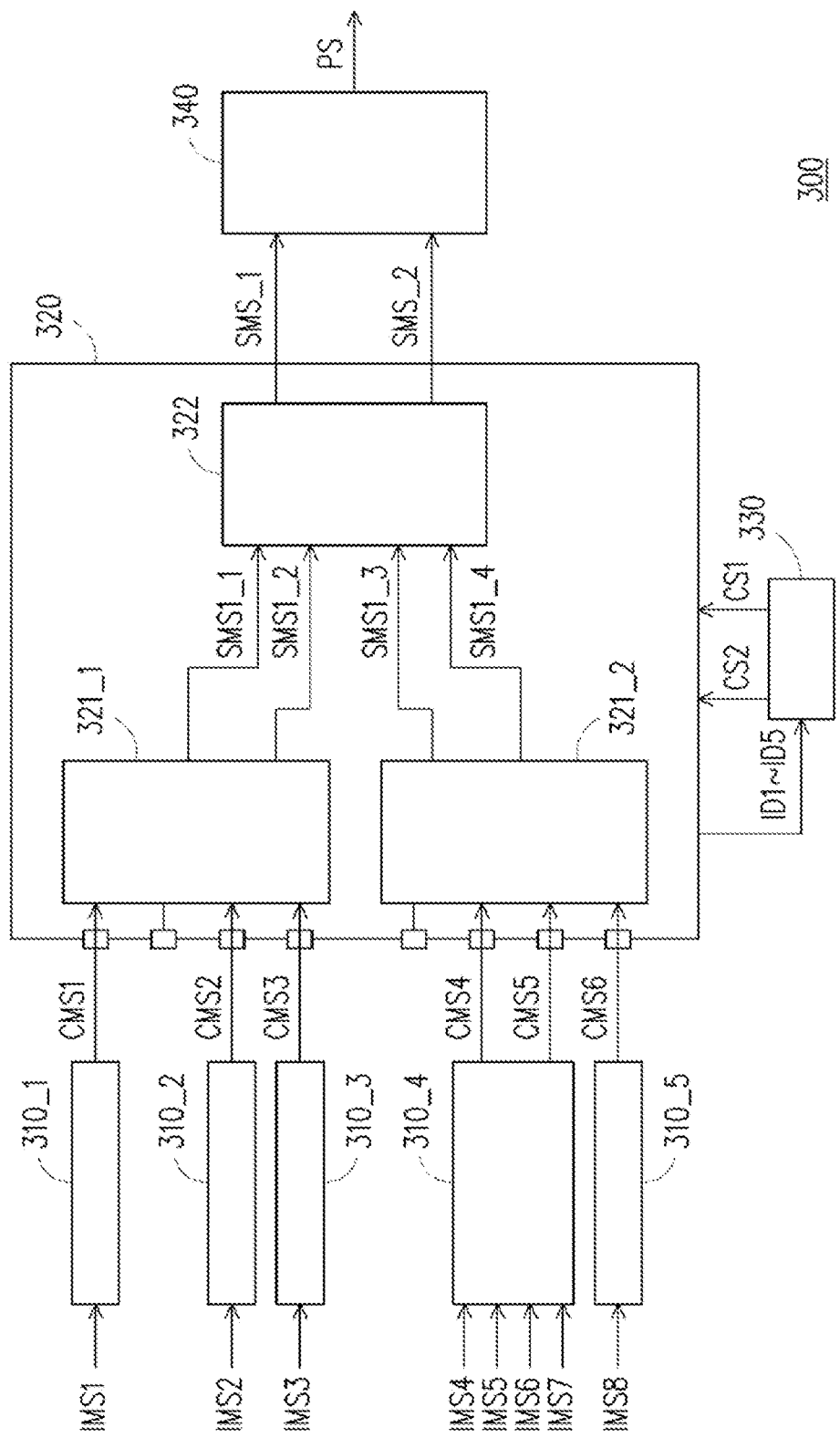
FIG. 4 is a schematic view of an image processing device according to a third embodiment of the disclosure.

Please refer to FIG. 4. FIG. 4 is a schematic view of an image processing device according to a third embodiment of the disclosure. In the embodiment, an image processing device 300 includes image input units 310_1 to 310_5, an expansion module 320, a controller 330, and an image processing module 340. The implementations of the image input units 310_1 to 310_5 and the image processing module 340 of the embodiment are the same as the implementations of the image input units 110_1 to 110_5 and the image processing module 140 of the first embodiment, so there will be no reiteration here. In the embodiment, the controller 330 may provide the first selection signal CS1 and a second selection signal CS2 according to identification codes ID1 to ID5 corresponding to the image input units 310_1 to 310_5. The generation of the second selection signal CS2 is the same as the generation of the first selection signal CS1, so there will be no reiteration here. The expansion module 320 includes first-level selection units 321_1 and 321_2, and a second-level selection unit 322. The first-level selection units 321_1 and 321_2 are detachably coupled to the image input units 310_1 to 310_5, and are respectively configured to receive at least three of the converted image signals CMS1 to CMS6. The first-level selection units 321_1 and 321_2 are respectively configured to output a first number of first-level selected image signals SMS1_1 to SMS1_2 and SMS1_3 to SMS1_4 according to the first selection signal CS1. The second-level selection unit 322 is coupled to the first-level selection units 321_1 and 321_2, so as to receive the first-level selected image signals SMS1_1 to SMS1_2 and SMS1_3 to SMS1_4 from the first-level selection units 321_1 and 321_2, and outputs the first number of the selected image signals SMS_1 and SMS_2 according to the second selection signal CS2.

In the embodiment, the first-level selection units 321_1 and 321_2, and the second-level selection unit 322 may be implemented by a field programmable gate array (FPGA).

For example, according to usage requirements, the first-level selection unit 321_1 is coupled to the image input units 310_1 to 310_3 and receives the converted image signals CMS1 to CMS3. The first-level selection unit 321_1 outputs the first number of the first-level selected image signals according to the first selection signal CS1. In other words, the first-level selection unit 321_1 selects the first number of the converted image signals (i.e., two of the converted image signals CMS1 to CMS3) from the selected converted image signals CMS1 to CMS3 according to the first selection signal CS1 as the first-level selected image signals SMS1_1 and SMS1_2. Then, the first-level selection unit 321_1 outputs the first-level selected image signals SMS1_1 and SMS1_2. It is particularly note that the first-level selection unit 321_1 will receive more than 3 converted image signals (i.e., the converted image signals CMS1 to CMS3). Therefore, the first-level selection unit 321_1 needs the first selection signal CS1 as the selection basis for determining the first-level selected image signals SMS1_1 and SMS1_2 from the converted image signals CMS1 to CMS3. If the first-level selection unit 321_1 receives 1 or 2 converted image signals, the received converted image signal(s) may be directly used as the first-level selected image signals SMS1_1 and/or SMS1_2.

With the same reasoning, according to usage requirements, the first-level selection unit 321_2 is coupled to the image input units 310_4 and 310_5, and receives the converted image signals CMS4 to CMS6. The first-level selection unit 321_2 outputs the first number of the first-level selected image signals according to the first selection signal CS1. In other words, the first-level selection unit 321_2 selects the first number of the converted image signals (i.e., two of the converted image signals CMS4 to CMS6) from the selected converted image signals CMS4 to CMS6 according to the first selection signal CS1 as the first-level selected image signals SMS1_3 and SMS1_4. Then, the first-level selection unit 321_2 outputs the first-level selected image signals SMS1_3 and SMS1_4.

Following the embodiment above, the second-level selection unit 322 is coupled to the first-level selection units 321_1 and 321_2, so as to receive the first-level selected image signals SMS1_1 to SMS1_4 from the first-level selection units 321_1 and 321_2. The second-level selection unit 322 selects the first number of the first-level selected image signals (i.e., two of the first-level selected image signals SMS1_1 to SMS1_4) from the first-level selected image signals SMS1_1 to SMS1_4 according to the second selection signal CS2 as the selected image signals SMS_1 and SMS_2. Next, the second-level selection unit 322 outputs the selected image signals SMS_1 and SMS_2. In this embodiment, the second-level selection unit 322 will receive more than 3 first-level selected image signals (i.e., the first-level selected image signals SMS1_1 to SMS1_4). Therefore, the second-level selection unit 322 needs the second selection signal CS2 as the selection basis for determining the selected image signals SMS_1 and SMS_2 from the first-level selected image signals SMS1_1 to SMS1_4. It is particularly noted that if the second-level selection unit 322 receives only 1 or 2 first-level selected image signals, the received first-level selected image signal(s) may be directly used as the selected image signals SMS_1 and/or SMS_2.

It is worth mentioning here that the first-level selection units 321_1 and 321_2, and the second-level selection unit 322 similarly have the same number of input interfaces (for example, 4) and similarly output the first number (for example, 2) of signals. Therefore, the first-level selection units 321_1 and 321_2, and the second-level selection unit 322 may be implemented by the FPGA of the same design or similar designs, so as to reduce the design complexity of the expansion module 320. However, the disclosure is not limited thereto. In other embodiments, the first-level selection units 321_1 and 321_2, and the second-level selection unit 322 may be designed to have different numbers of input interfaces and output signals according to requirements.

Figure 5:
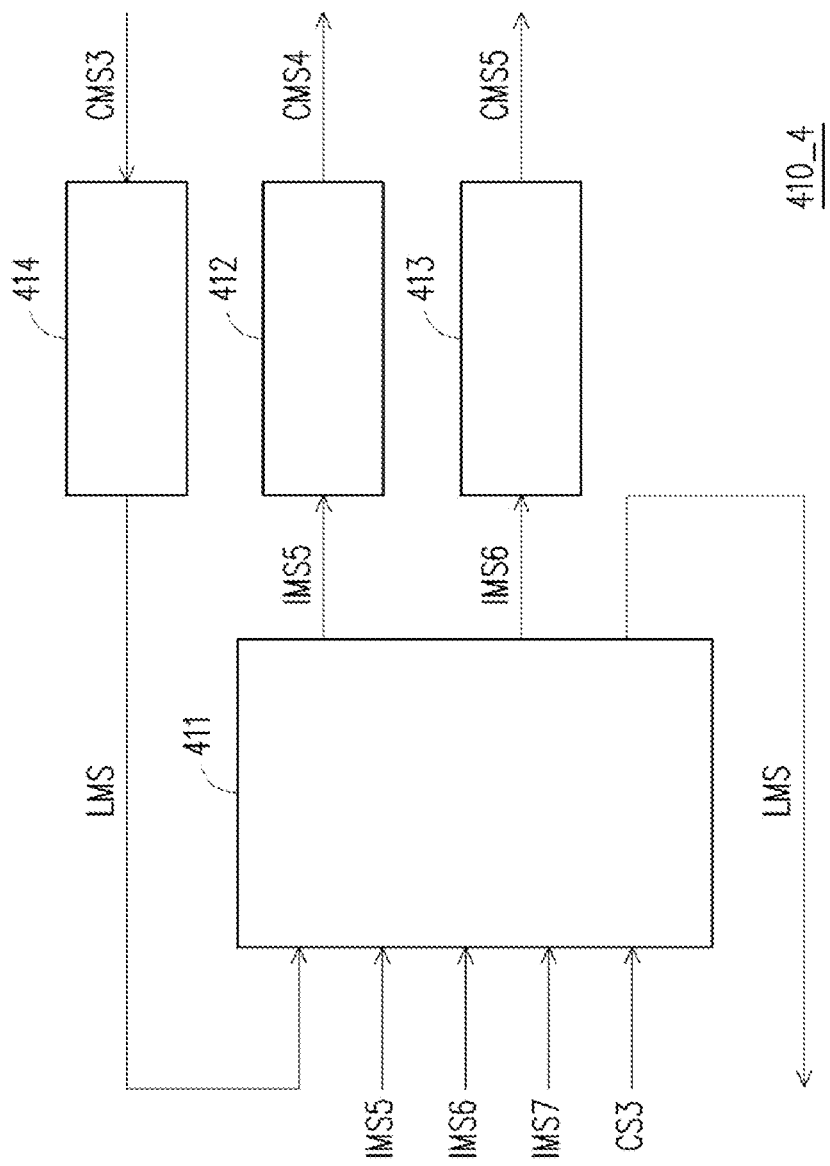
FIG. 5 is a schematic view of an image input unit according to an embodiment of the disclosure.

Please refer to FIG. 5. FIG. 5 is a schematic view of an image input unit according to an embodiment of the disclosure. In the embodiment, an image input unit 410_4 includes at least 3 second input interfaces (for example, an interface of the image input unit 410_4 configured to connect to the image signal IMS7), a distributor 411, and second format converters 412 and 413. The second input interface of the image input unit 410_4 receives the image signals IMS5 to IMS7. The image signals IMS5 to IMS7 may respectively have a second image format or a third image format, for example, image signals having the HDMI or DVI format. For example, the image signals IMS5 and IMS6 are image signals having the HDMI format, and the image signal IMS7 is an image signal having the DVI format. The distributor 411 receives a third selection signal CS3. The third selection signal CS3 is, for example, provided by the controller 330 of FIG. 4, but the disclosure is not limited thereto. The distributor 411 is configured to receive the image signals IMS5 to IMS7 and output two of the image signals IMS5 to IMS7 (i.e., the image signals IMS5 and IMS6) to the second format converters 412 and 413 according to the third selection signal CS3. In the embodiment, the third selection signal CS3 determines the selection priority of the image signals IMS5 to IMS7 according to an identification code of the image input unit 410_4. After the distributor 411 receives the third selection signal CS3, the distributor 411 will output two of the image signals IMS5 to IMS7 according to the third selection signal CS3.

The second format converter 412 is coupled to the distributor 411 to receive the image signal IMS5 and convert the image signal IMS5 into the converted image signal CMS4 having the first image format. The second format converter 413 is coupled to the distributor 411 to receive the image signal IMS6 and convert the image signal IMS6 into the converted image signal CMS5 having the first image format. For ease of explanation, the image input unit 410_4 in the embodiment receives 3 image signals and 2 second format converters 412 and 413. However, the disclosure is not limited thereto. In other embodiments, according to actual requirements, the image input unit 410_4 may receive more than 3 image signals and more than 2 second format converters.

In addition, the image input unit 410_4 may also include a third format converter 414 and an output interface (for example, an interface of the image input unit 410_4 configured to output a stitched image signal LMS). The third format converter 414 is configured to receive the converted image signal CMS3 outputted from another image input unit (for example, the image input unit 310_3) and convert the converted image signal CMS3 into the stitched image signal LMS having the HDMI or DVI format, but the disclosure is not limited thereto. In other embodiments, other converted image signals (for example, the converted image signals CMS1 and CMS2) may be outputted as the stitched image signal LMS. Then, the image processing device outputs the stitched image signal LMS through the image input unit 410_4. For example, the image processing device outputs the stitched image signal LMS sequentially through the distributor 411 and the output interface. The number of the third format converters of the disclosure may be one or more. Therefore, the disclosure may receive at least one converted image signal and convert the at least one converted image signal into a stitched image signal having the HDMI or DVI format. The disclosure is not limited to the embodiment.

It is worth mentioning here that the image processing device may output the stitched image signal LMS by the image input unit 410_4. In this way, the stitched image signal LMS may be provided to another projection device, so as to implement image splicing of multiple projection devices.

It should be understood that the image input unit 410_4 of the embodiment may be used as the image input unit 110_4 of the embodiment of FIG. 1 and the image input unit 310_4 of the embodiment of FIG. 4.

Figure 6:
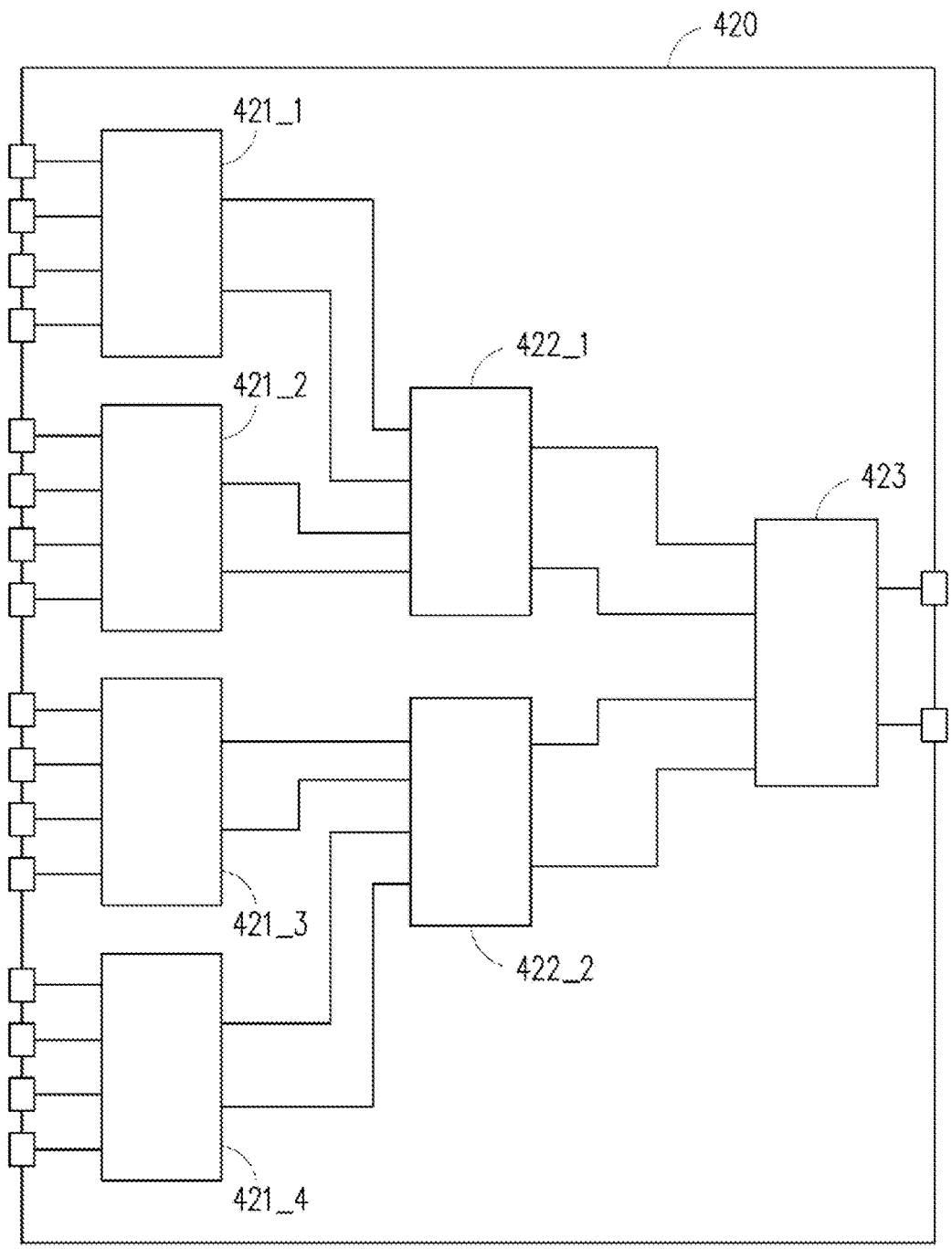
FIG. 6 is a schematic view of an expansion module according to an embodiment of the disclosure.

Next, an embodiment of expanding an expansion module is described. Please refer to FIG. 6. FIG. 6 is a schematic view of an expansion module according to an embodiment of the disclosure. In the embodiment, an expansion module 420 includes first-level selection units 421_1 to 421_4, second-level selection units 422_1 and 422_2, and a third-level selection unit 423. The second-level selection unit 422_1 is coupled to the first-level selection units 421_1 and 421_2 to receive the signals outputted from the first-level selection units 421_1 and 421_2. The second-level selection unit 422_2 is coupled to the first-level selection units 421_3 and 421_4 to receive the signals outputted from the first-level selection units 421_3 and 421_4. The third-level selection unit 423 is coupled to the second-level selection units 422_1 and 422_2 to receive the signals outputted from the second-level selection units 422_1 and 422_2.

In the embodiment, the first-level selection units 421_1 to 421_4, the second-level selection units 422_1 and 422_2, and the third-level selection unit 423 may be respectively implemented by the FPGA.

For example, the first-level selection units 421_1 to 421_4, the second-level selection units 422_1 and 422_2, and the third-level selection unit 423 respectively have, for example, 4 input interfaces and 2 output interfaces. Therefore, the expansion module 420 may receive up to 16 converted image signals. In addition, the first-level selection units 421_1 to 421_4, the second-level selection units 422_1 and 422_2, and the third-level selection unit 423 similarly have the same number of input interfaces (for example, 4) and similarly output the first number (for example, 2) of signals. Therefore, the first-level selection units 421_1 to 421_4, the second-level selection units 422_1 and 422_2, and the third-level selection unit 423 may be implemented by the FPGA of the same design or similar designs.

It should be understood that the expansion module 420 of the embodiment may be used as the expansion module 120 of the embodiment of FIG. 1, the expansion module 220 of the embodiment of FIG. 2, and the expansion module 320 of the embodiment of FIG. 4.

It can be known that, in the embodiments of FIG. 1 and FIG. 3, when the input of the image processing device 100 of the first embodiment or the image processing device 300 of the third embodiment needs to be expanded to receive more image signals, the level number of the selection unit inside the expansion modules 120 and 320 may be increased without the need to redesign the image processing modules 140 and 340.

Based on the above, the disclosure may select the corresponding image input unit according to the image signal format to be received and may detachably couple the image input unit to the expansion module according to usage requirements. In this way, the user may select the suitable image input unit according to the multiple image signal format requirements and the flexibility of the image processing device in receiving the image signal can be improved. In addition, when the input of the image processing device needs to be expanded to receive more image signals, the level number of the selection unit inside the expansion module may be increased without the need to redesign the image processing module, so as to simplify the complexity of making changes to the image processing device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image processing device, comprising a plurality of image input units, an expansion module, a controller, and an image processing module, wherein:

the plurality of image input units are configured to receive a plurality of image signals and convert the plurality of image signals into a plurality of converted image signals, and the plurality of converted image signals have a first image format;

the expansion module is detachably coupled to the plurality of image input units and is configured to output a first number of selected image signals according to a first selection signal;

the controller is coupled to the expansion module and is configured to provide the first selection signal; and the image processing module is coupled to the expansion module and is configured to receive the first number of the selected image signals to integrate into a picture in picture, wherein the expansion module comprises a plurality of first-level selection units and a second-level selection unit, and the controller further provides a second selection signal, wherein:

the plurality of first-level selection units are respectively configured to receive at least three of the plurality of converted image signals and are respectively configured to output the first number of first-level selected image signals according to the first selection signal; and the second-level selection unit is configured to receive at least three of the first-level selected image signals and output the first number of the selected image signals according to the second selection signal.

2. The image processing device according to claim 1, wherein the plurality of first-level selection units and the second-level selection unit are respectively implemented by a field programmable gate array.

3. An image processing device, comprising a plurality of image units, an expansion module, a controller, and an image processing module, wherein:

the plurality of image input units are configured to receive a plurality of image signals and convert the plurality of image signals into a plurality of converted image signals, and the plurality of converted image signals have a first image format;

the expansion module is detachably coupled to the plurality of image input units and is configured to output a first number of selected image signals according to a first selection signal;

the controller is coupled to the expansion module and is configured to provide the first selection signal and a second selection signal; and the image processing module is coupled to the expansion module and is configured to receive the first number of the selected image signals to integrate into a picture in picture, wherein each of the plurality of image input units has an identification code, wherein the expansion module is further configured to transmit the identification code of each of the plurality of image input units to the controller, wherein the controller generates the first selection signal and the second selection signal according to the identification code of each of the plurality of image input units.

4. An image processing device, comprising a plurality of image input units, an expansion module, a controller, and an image processing module, wherein:
the plurality of image input units are configured to receive a plurality of image signals and convert the plurality of image signals into a plurality of converted image signals, and the plurality of converted image signals have a first image format;
the expansion module is detachably coupled to the plurality of image input units and is configured to output a first number of selected image signals according to a first selection signal;
the controller is coupled to the expansion module and is configured to provide the first selection signal; and
the image processing module is coupled to the expansion module and is configured to receive the first number of the selected image signals to integrate into a picture in picture, wherein one of the plurality of image input units comprises a first input interface and a first format converter, wherein:
the first input interface is configured to receive a first image signal in the plurality of image signals; and
the first format converter is coupled to the first input interface and is configured to convert the first image signal into one of the plurality of converted image signals having the first image format,
wherein the controller further provides a third selection signal, wherein one of the plurality of image input units comprises a plurality of second input interfaces, a distributor, and at least one second format converter, wherein:
the plurality of second input interfaces are configured to receive a plurality of second image signals in the plurality of image signals, one of the plurality of second image signals has a second image format, and another one of the plurality of second image signals has a third image format;
the distributor is coupled to the controller and is configured to receive the plurality of second image signals and output at least two of the plurality of second image according to a third selection signal; and
the at least one second format converter is coupled to the distributor and is configured to receive the at least two of the plurality of second image signals and convert the at least two of the plurality of second image signals into at least two of the plurality of converted image signals having the first image format.

5. The image processing device according to claim 4, wherein the second image input unit further comprises a third format converter and an output interface, the third format converter is configured to receive at least one of the plurality of converted image signals outputted by the plurality of image input units and convert the at least one of the plurality of converted image signals into a stitched image signal having the second image format, wherein the image processing device outputs the stitched image signal through the second image input unit.

6. An image processing method, comprising:
providing a plurality of image input units and an expansion module, and detachably coupling the expansion module to the plurality of image input units;
receiving, by the plurality of image input units, a plurality of image signals and converting the plurality of image signals into a plurality of converted image signals, wherein the plurality of converted image signals have a first image format;
providing a first selection signal and outputting, by the expansion module, a first number of selected image signals according to the first selection signal; and
receiving the first number of the selected image signals to integrate into a picture in picture,
wherein the expansion module comprises a plurality of first-level selection units and a second-level selection unit, wherein the plurality of first-level selection units are respectively configured to receive at least three of the plurality of converted image signals, wherein the step of outputting, by the expansion module, the first number of the selected image signals according to the first selection signal comprises:
providing a second selection signal;
outputting, by each of the plurality of first-level selection units, the first number of the first-level selected image signals according to the first selection signal; and
receiving, by the second-level selection unit, at least three of the first-level selected image signals and outputting the first number of the selected image signals according to the second selection signal.

7. The image processing method according to claim 6, wherein the step of providing the plurality of image input units and the expansion module comprises:
implementing, by a plurality of field programmable gate arrays, the plurality of first-level selection units and the second-level selection unit.

8. An image processing method, comprising:
providing a plurality of image input units and an expansion module, and detachably coupling the expansion module to the plurality of image input units;
receiving, by the plurality of image input units, a plurality of image signals and converting the plurality of image signals into a plurality of converted image signals, wherein the plurality of converted image signals have a first image format;
providing a first selection signal and outputting, by the expansion module, a first number of selected image signals according to the first selection signal;
providing a second selection signal; and
receiving the first number of the selected image signals to integrate into a picture in picture, wherein each of the plurality of image input units has an identification code, wherein the image processing method further comprises:
receiving the identification code of each of the plurality of image input units transmitted by the expansion module.

9. The image processing method according to claim 8, wherein
the step of providing the first selection signal comprises:
generating the first selection signal according to the plurality of identification codes; and the step of providing the second selection signal comprises:

generating the second selection signal according to the identification code of each of the plurality of image input units.

10. An image processing method, comprising:

providing a plurality of image input units and an expansion module, and detachably coupling the expansion module to the plurality of image input units;

receiving, by the plurality of image input units, a plurality of image signals and converting the plurality of image signals into a plurality of converted image signals, wherein the plurality of converted image signals have a first image format;

providing a first selection signal and outputting, by the expansion module, a first number of selected image signals according to the first selection signal; and receiving the first number of the selected image signals to integrate into a picture in picture, wherein one of the plurality of image input units comprises a first input interface and a first format converter, and the first format converter is coupled to the first input interface, wherein the step of receiving, by the plurality of image input units, the plurality of image signals and converting the plurality of image signals into the plurality of converted image signals comprises:

receiving, by the first input interface, a first image signal in the plurality of image signals; and converting, by the first format converter, the first image signal into one of the plurality of converted image signals having the first image format, wherein one of the plurality of image input units comprises a plurality of second input interfaces, a distributor, and at least one second format converter, wherein the step of receiving, by the plurality of image input units, the plurality of image signals and converting the plurality of image signals into the plurality of converted image signals further comprises:

providing a third selection signal;

receiving, by the plurality of second input interfaces, a plurality of second image signals in the plurality of image signals, wherein one of the plurality of second image signals has a second image format and another one of the plurality of second image signals has a third image format;

receiving, by the distributor, the plurality of second image signals and outputting at least two of the plurality of second image signals according to a third selection signal; and receiving, by the second format converter, the plurality of selected image signals and converting the at least two of the plurality of second image signals into at least two of the plurality of converted image signals having the first image format.

11. The image processing method according to claim 10, wherein the second image input unit further comprises a third format converter and an output interface, wherein the step of receiving, by the plurality of image input units, the plurality of image signals and converting the plurality of image signals into the plurality of converted image signals further comprises:

receiving, by the third format converter, at least one of the plurality of converted image signals outputted by the plurality of image input units and converting the at least one of the plurality of converted image signals into a stitched image signal having the second image format; and outputting, by the second image input unit, the stitched image signal.

* * * * *